United States Patent [19]

Fowler et al.

[11] Patent Number: 5,741,038
[45] Date of Patent: Apr. 21, 1998

[54] APPARATUS FOR EXTENDING EFFECTIVE DIMENSIONS OF TRUCK BED

[76] Inventors: Don Albert Fowler, 507 Gorman Ave., Laurel, Md. 20707; Leslie Fowler, 524 Londontown Rd., Edgewater, Md. 21037

[21] Appl. No.: 618,795

[22] Filed: Mar. 20, 1996

[51] Int. Cl.⁶ ........................... B60P 3/40
[52] U.S. Cl. ........................... 296/3; 296/26
[58] Field of Search ........................... 296/3, 26

[56] References Cited

U.S. PATENT DOCUMENTS

| | | | |
|---|---|---|---|
| 2,518,624 | 8/1950 | Kraft | 296/3 |
| 2,712,470 | 7/1955 | Cardini | 296/26 |
| 4,211,448 | 7/1980 | Weston | 296/3 |
| 4,444,427 | 4/1984 | Martin | 296/3 |
| 4,527,827 | 7/1985 | Maniscalco et al. | 296/3 |
| 4,770,458 | 9/1988 | Burke et al. | 296/3 |
| 4,951,991 | 8/1990 | Haigler | 296/26 |
| 5,456,511 | 10/1995 | Webber | 296/26 |
| 5,522,685 | 6/1996 | Lessard | 296/26 |
| 5,533,771 | 7/1996 | Taylor et al. | 296/26 |
| 5,544,798 | 8/1996 | Shumate et al. | 296/3 |
| 5,553,762 | 9/1996 | Brown | 296/3 |

*Primary Examiner*—Gary C. Hoge
*Attorney, Agent, or Firm*—Burns, Doane, Swecker & Mathis, L.L.P.

[57] ABSTRACT

An apparatus for extending the effective width and length of a bed of a truck. Two runners mount onto the track via pedestals and have cradles to hold the cross bars in place. The cross bars span the width of the truck so that loads wider than the width of the track between the wheel wells can be carried. The apparatus also includes telescoping runners which extend outward up to two feet to hold longer cargo.

16 Claims, 7 Drawing Sheets

5,741,038

APPARATUS FOR EXTENDING EFFECTIVE DIMENSIONS OF TRUCK BED

TECHNICAL FIELD OF THE INVENTION

The present invention is directed to a pick-up truck accessory, and more particularly, to an apparatus for extending the effective width and length of the bed of a pick-up truck, thereby assisting with transporting oversized loads.

BACKGROUND OF THE INVENTION

Pick-up truck accessories for extending the length and/or the width of the truck bed have generally been large, bulky attachments which utilize the space over the top of the truck cab in order to obtain an extension of the effective length of the truck bed.

U.S. Pat. No. 4,770,458 to Burke et al., for example, discloses a utility rack that is mounted within the bed of the truck. The rack includes front and rear tubular stanchions having legs which support the cross members thereof. An over-cab cross member is provided to increase the effective length of the rack.

As a further example, U.S. Pat. No. 4,211,448 to Weston discloses a rack assembly having a plurality of legs connected to the top of the side panels of the truck, elongated longitudinal upper and lower bar members, and a plurality of transverse rail members extending across the truck bed. Weston also includes an overcab assembly having a pair of U-form brackets.

In each of the above-described examples, the transverse support members are elevated to the height of the transverse member extending over the cab of the truck. Thus, the only effective extension of the length or width that is obtained is also elevated to a height over the cab, making it difficult to load, unload, and safely secure an oversized load.

SUMMARY OF THE INVENTION

These, and other, problems, drawbacks and limitations of conventional pickup truck racks are overcome according to the accessory apparatus of the present invention for use with a truck having opposing side panels, a truck bed extending between the side panels and a truck cab. The accessory includes first and second outer runners attachable to each side panel of the truck in a position behind the truck cab and a plurality of center bars extending transversely between the first and second outer runners across a width of the truck bed. Thus, the center bars define a support surface behind the truck cab immediately above the side walls of the truck for supporting a load.

The present invention also provides an apparatus for extending the effective dimensions of a truck bed having opposing side panels. The apparatus includes a pair of outer runners, one of the runners attachable above each side panel of the truck bed, a plurality of center bars having first and second ends extending transversely between the pair of outer runners, and a pair of telescoping runners, with each of the telescoping runners being received within one of the outer runners. The telescoping runners can be adjustably locked in a first extended position, thereby defining a first extension length, or in a second extended position, thereby defining a second extension length, the second extension length being greater than the first extension length.

The above-described apparatus of the present invention has many advantages over other options in transporting loads with trucks that have beds with less than a four foot width between the wheel wells and/or less than an eight foot length. These advantages are:

a.) To allow flat objects or material with the width of four feet or more to be carried easily.

b.) To allow objects longer than the bed of the truck to be carried.

c.) To increase the hauling ability of a small truck if a tool box accessory is present.

d.) To add safety by supporting bands that can jack down the load.

e.) To allow easy removal of the center bars so that full bed can be used.

f.) To create the ability to haul a load above the sides of the truck while utilizing the space underneath the load.

g.) To allow for a vinyl cover to be attached to the bed extending apparatus using the center bar frame.

h.) To use as tie downs when center bars are removed.

In addition, the apparatus of the present invention is easy to manufacture and is a safety device because of the bands securing any load tightly.

BRIEF DESCRIPTION OF THE DRAWINGS

These, and other, objects, features and advantages of the present invention will become more readily apparent to those skilled in the art upon reading the following detailed description, in conjunction with the appended drawings, in which.

DETAILED DESCRIPTION OF THE PREFERRED EMBODIMENTS

Figure 1:
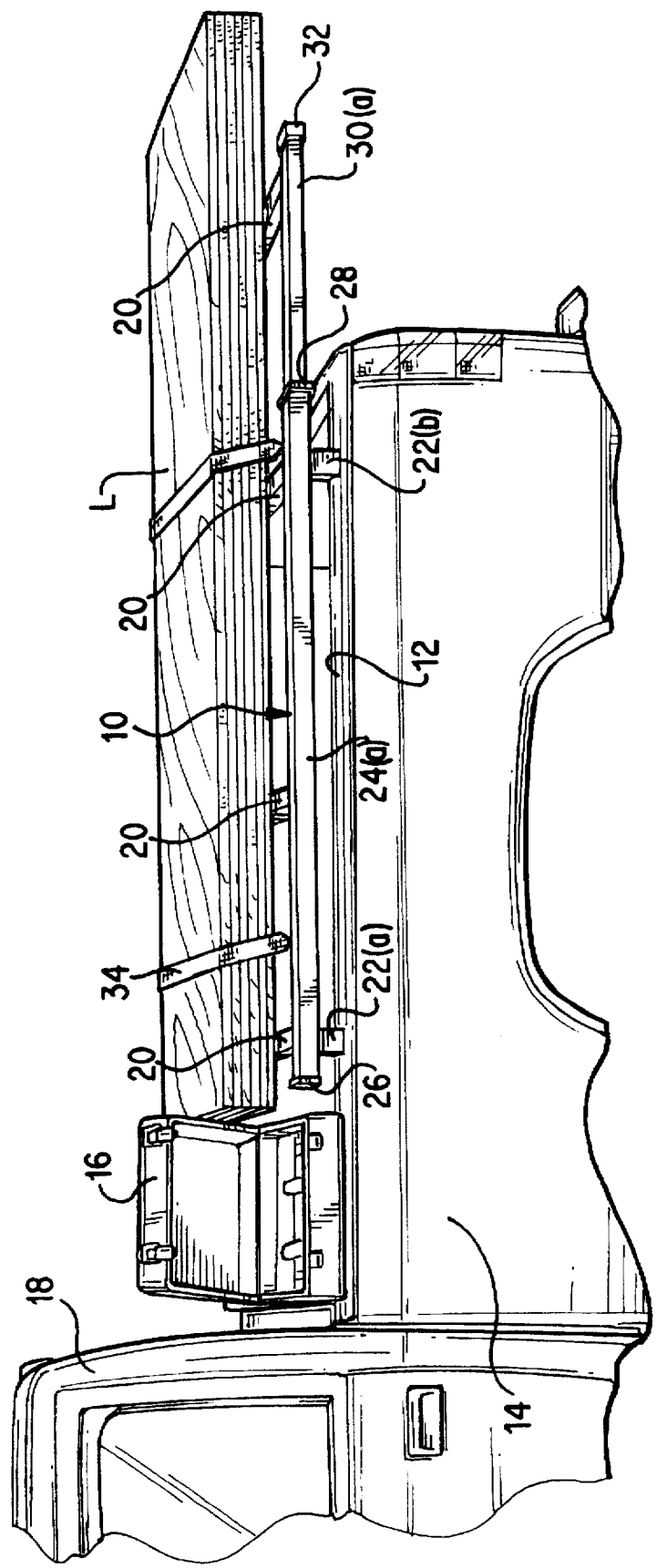
FIG. 1 illustrates a side elevational view of a bed extending apparatus in accordance with the present invention, as installed on a truck with the telescoping runners extended.

Referring to FIG. 1, the bed extending apparatus of the present invention is shown generally by reference numeral (10). The bed extending apparatus (10) includes first and second outer runners (24a, 24b) mounted on the top edge (12) of the pick-up truck bed (14) either behind a tool box accessory (16) or behind the cab (18) of the truck. A telescoping runner (30a, 30b) is a four foot bar sliding inside each of the first and second outer runners (24a, 24b), respectively. The telescoping runners will extend in one and two foot increments, as discussed in detail below, leaving at least two feet of the telescoping runner (30a, 30b) within the outer runners for strength. Each of the first and second outer runners (24a, 24b) sits on front and rear pedestals (22a, 22b) which are provided toward the front of the truck bed (14) and toward the rear of the truck bed (14). The terminal end of each runner (24a, 24b, 30a, 30b) is capped with a rubber cap (26, 28, 32) for safety and appearance. Center bars (20) are also provided between the first and second outer runners (24a, 24b) to bridge the two sides of the truck.

The design of the bed extending apparatus of the present invention is thus simple yet unique. It will preferably be made of steel or other strong material that will be bolted to the top edges of the truck sides. A load of plywood (L) is shown in FIG. 1 to better illustrate the purpose and advantages of the invention. More specifically, the center bars of the present invention allow large flat loads having a width of four feet or more to be bound to a truck that is less than four feet in width between the wheel wells. The plywood or other load (L) is strapped down by jack down belts (34), which are generally known in the art and form no part of the present invention.

Figure 2:
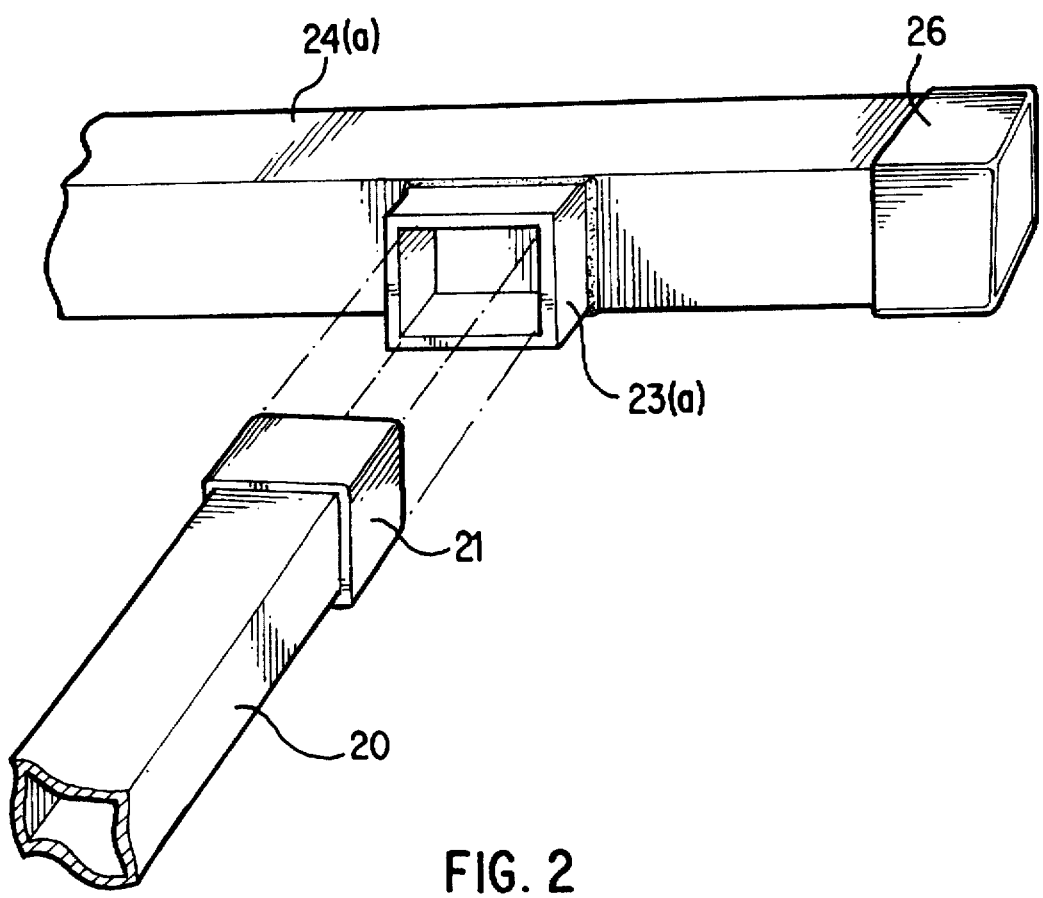
FIG. 2 illustrates a closed cradle thereof.
Figure 3:
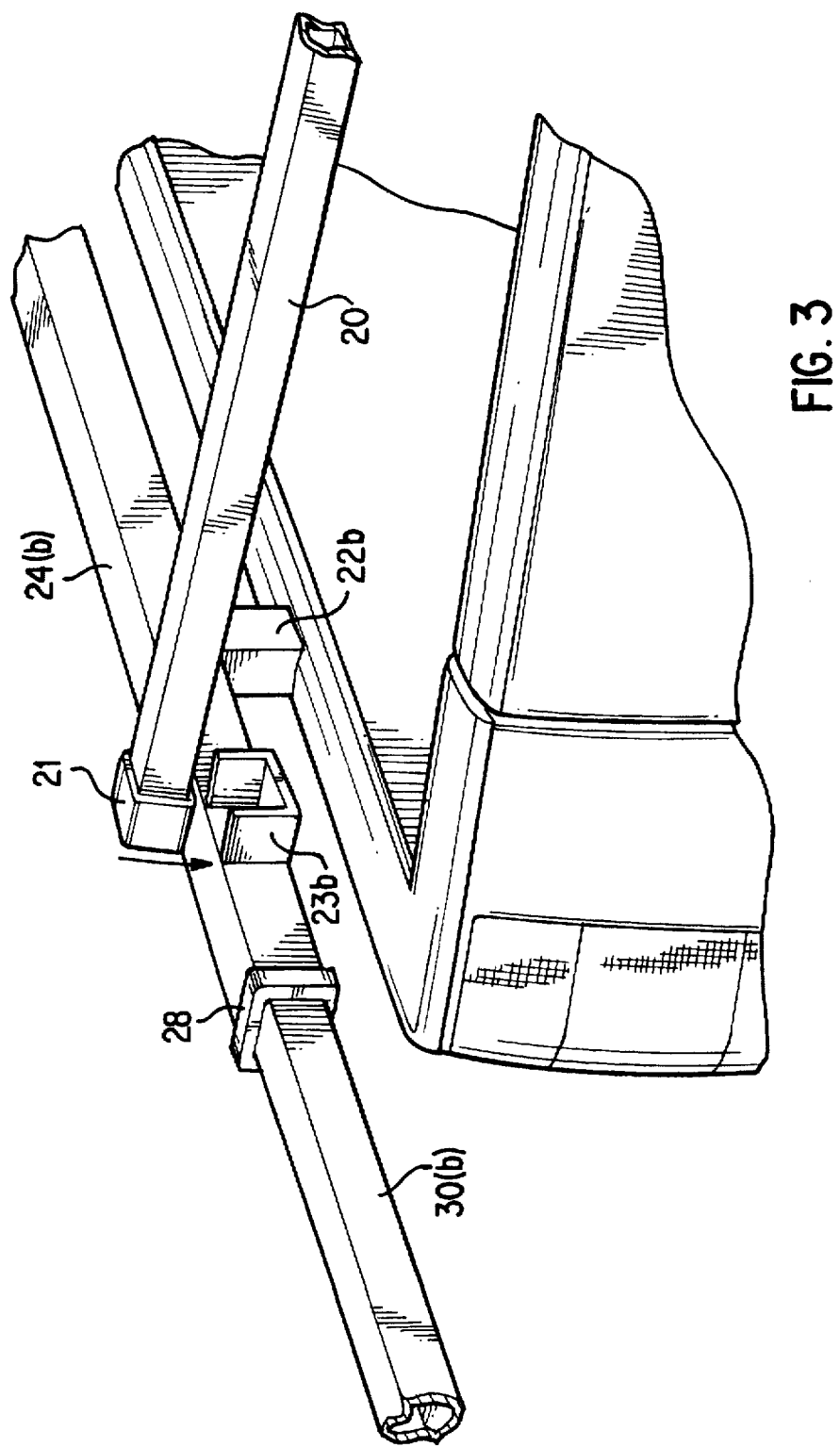
FIG. 3 illustrates an open cradle thereof.

Referring also to FIGS. 2 and 3, the center bars (20) are removably held in open and closed cradles (23a, 23b) that are attached to the first and second outer runners (24a, 24b), respectively. A rubber cap (21) is placed on the tip of each center bar (20) for a snug fit into the cradle. The rubber cap also controls noise. The runner (24a, 24b) also has a rubber cap (26) for safety and for appearance. There are preferably three closed end cradles (23a) welded to the first outer runner (24a) and one closed end cradle (23a) welded to the telescoping runner (30a) to thereby hold a first end of four center bars (20). FIG. 3 shows an open end cradle (23b) which holds the opposite end of the center bar (20) than the closed end cradle (23a) shown in FIG. 2. There are preferably three open ended cradles (23b) welded to the second outer runner (24b) and one open ended cradle (23b) welded to the telescoping runner (30b). These cradles (23b) hold a second end of the four center bars (20). The cradles are attached to the runners (24a, 24b) which are mounted on the side of the truck via pedestals (22a, 22b).

Figure 4A:
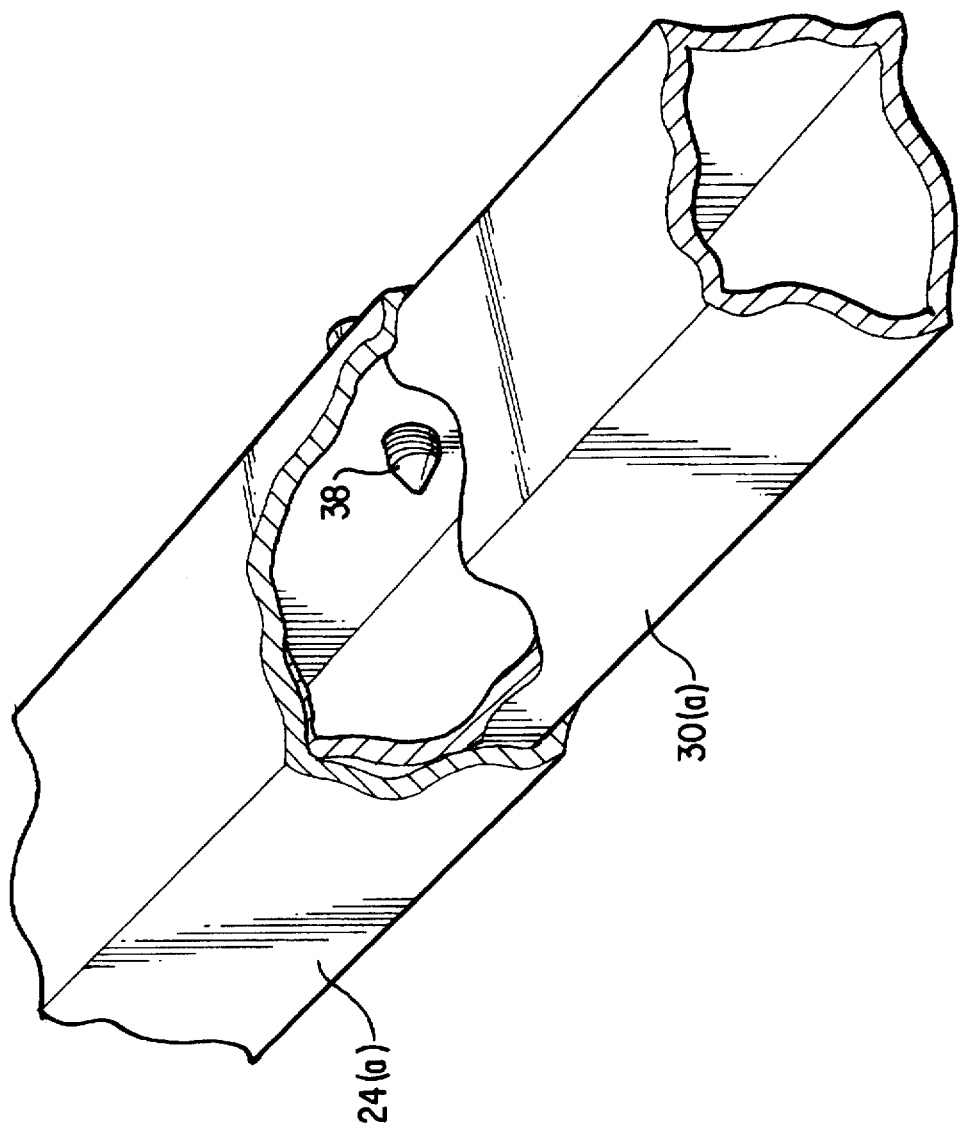
FIG. 4A illustrates a perspective view of a wing bolt thereof.
Figure 4B:
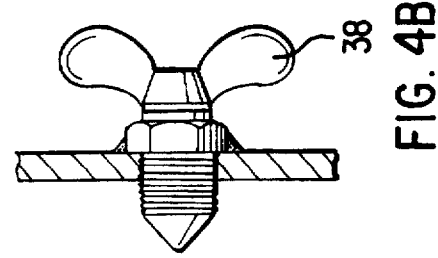
FIG. 4B illustrates a side elevation view of the wing bolt thereof.

FIGS. 4(A) and 4(B) illustrate the wing bolt (38) that is screwed into each of the outer runners (24a, 24b) to thereby connect it to the respective telescoping or inner runner (30a, 30b). The outer runners and the telescoping runners have threaded holes so that the wing bolt can tightly bind the two together. The wing bolt is never removed from the outer runner but only loosened to allow the telescoping runner to slide in and out.

Figure 5:
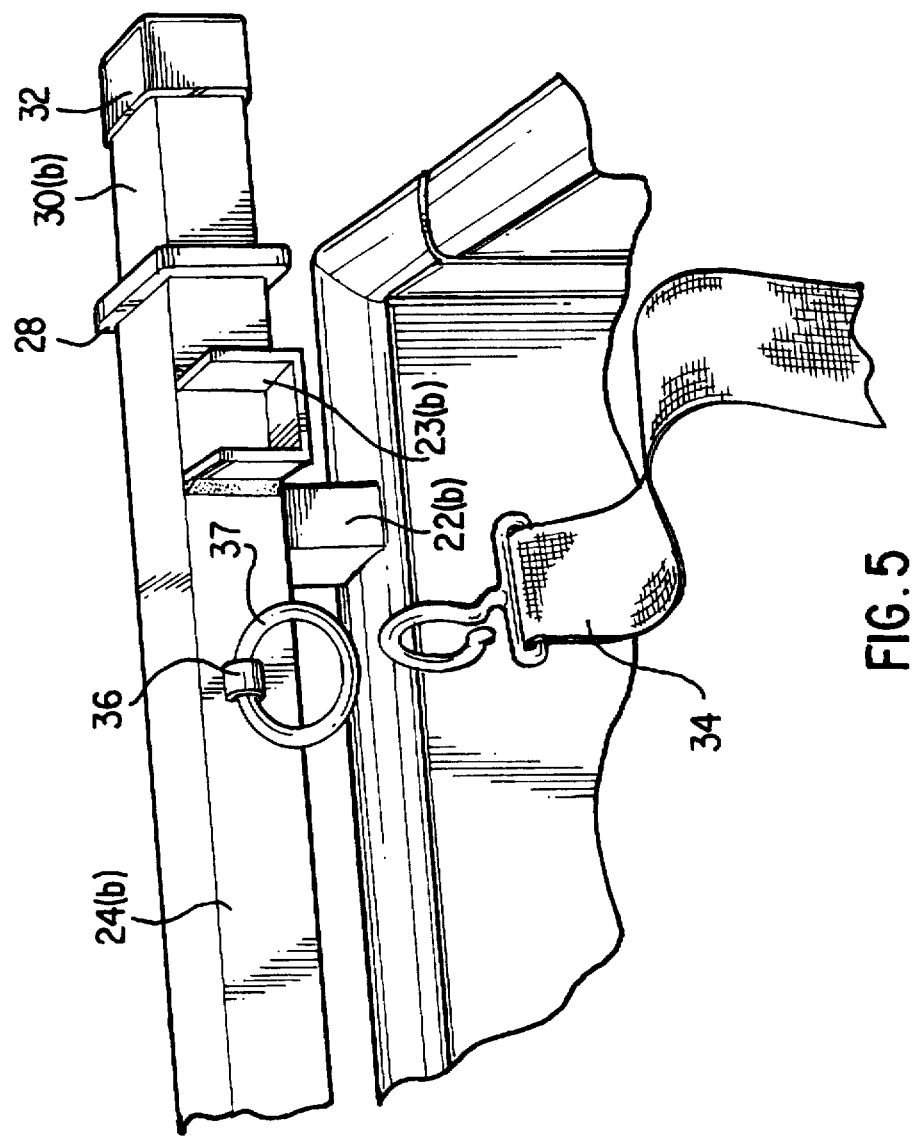
FIG. 5 illustrates a belt ring for holding a belt that secures the load on the bed extending apparatus shown in FIG. 1.

The belt ring (36) which is the connector used to hold the jack down belt (34) to the runner to secure the load is shown in FIG. 5. The belt ring (36) is a hoop made from steel that is held by a half circle of steel welded to the runner. The hoop portion (37) of the belt ring can swivel up and down.

Figure 6:
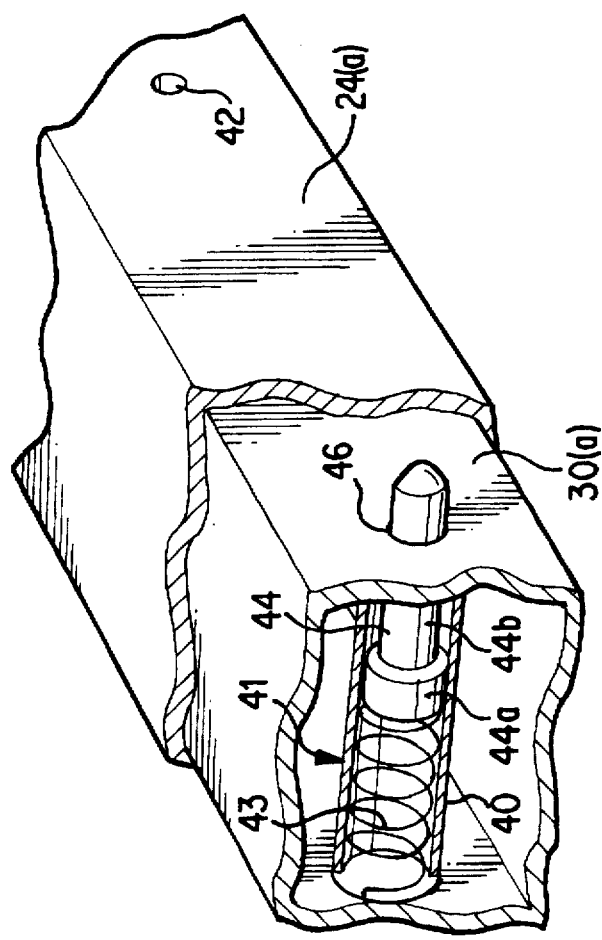
FIG. 6 illustrates a spring loaded pin thereof.
Figure 7:
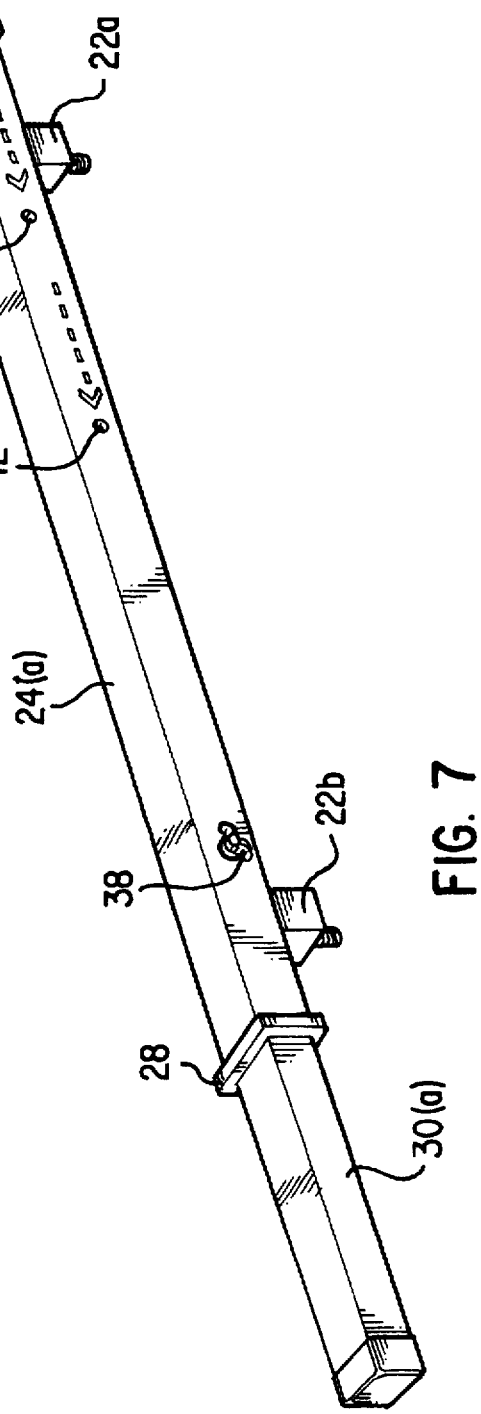
FIG. 7 illustrates a runner thereof.

FIGS. 6 and 7 illustrate a spring loaded pin assembly (40) used to lock the runners into position. The spring loaded pin assembly (40) includes a tube (41) extending between and connecting the inner walls of each of the telescoping runners (30a, 30b), with a spring (43) and a pin (44) enclosed therewithin. The pin (44) has a large base (44a) so that it cannot be forced out the pin hole (46) in the telescoping runner, and a smaller tip (44b) which does extend out of the pin hole (46). The telescoping runner slides in and out of the outer runner until a hole (42) in the outer runner is encountered, then the spring will force the pin (44) out of the pin hole (46) of the telescoping runner (30a, 30b) and into the pin hole (42) of the outer runner (24a, 24b) to thereby lock the runners together. The outer runner (24a, 24b) has two pin holes (42) that allows the spring loaded pin assembly (40) to stop the movement of the runners so that the threaded holes will line up in place for the wing bolt (38) to be fastened, and the telescoping runners will extend in one and two foot increments.

Figure 8:
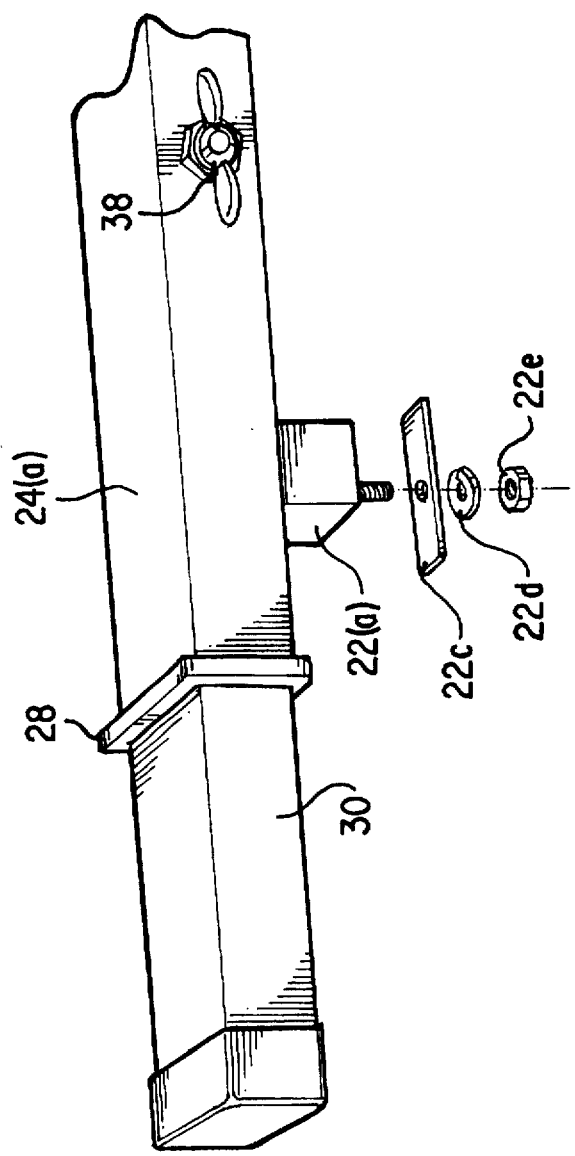
FIG. 8 illustrates a pedestal thereof.

FIG. 8 illustrates the pedestal (22a, 22b) used to mount the runners (24a, 24b) onto the side walls of the truck bed. The pedestal (22a, 22b) has a bolt welded in the base which goes through a pre-drilled hole in the lip of the truck bed. The pedestal brace (22c) is a rectangular shaped washer that is used to stabilize the runner. The lock washer (22d) and nut (22e) then secure the pedestal to the truck bed.

The bed extending apparatus of the present invention was invented to change the thinking of truck owners. Everyone wants more truck for less money that costs less to operate. The present invention will allow truck owners to haul more with less truck. Most people who buy full size half ton trucks are usually concerned with payload. Sheet rock and plywood could not be comfortably hauled with a small truck until now. The bed extending apparatus (10) of the present invention allows large flat or long items to be hauled safely and comfortably. The easy to break down design also makes this invention especially marketable. The present invention will allow and even encourage the use of tool boxes, as shown in FIG. 1, because the space lost by the tool box is restored by the extension of the telescoping runners.

We claim:

1. An apparatus for extending the effective dimensions of a truck bed having opposing side panels, said apparatus comprising:

a pair of outer runners each having a plurality of first locating means at longitudinally spaced points along the length thereof;

means for attaching one of said runners above each side panel of the truck bed;

a plurality of center bars having first and second ends extending transversely between said pair of outer runners;

a pair of telescoping runners, each of said telescoping runners being received within one of said outer runners, and each having at least one second locating means thereon;

means for releasably locking said telescoping runners in a first position in which said second locating means is aligned with one of said plurality of first locating means, and in a second position, in which said second locating means is aligned with a different one of said plurality of first locating means.

2. The apparatus of claim 1 wherein a first one of said pair of outer runners includes a plurality of closed cradles for receiving the first ends of said center bars.

3. The apparatus of claim 2 wherein a second one of said pair of outer runners includes a plurality of open cradles for receiving the second ends of said center bars.

4. The apparatus of claim 3 wherein a first of said telescoping runners includes a closed cradle for receiving the first end of one of said center bars and a second of said telescoping runners includes an open cradle for receiving the second end of one of said center bars.

5. The apparatus of claim 3, wherein said means for releasably locking comprises a wing bolt threadedly engaging said aligned first and second locating means.

6. The apparatus of claim 1 wherein each said outer runner includes a plurality of belt rings for holding belts that secure a load thereon.

7. The apparatus of claim 1 wherein said means for attaching comprises a plurality of pedestals for mounting said pair of outer runners to the side panels of the truck bed.

8. The apparatus of claim 1 wherein said means for releasably locking comprises a spring-loaded pin assembly on each of said telescoping runners for engaging said, aligned first and second locating means.

9. The apparatus of claim 8, wherein said spring-loaded pin assembly includes a tube member, a spring, and a pin actuated by said spring, and said second locating means comprises a pin-hole in alignment with said pin such that said pin is forced outward through said pin-hole.

10. The apparatus of claim 9 wherein said plurality of first locating means comprises a plurality of locating pin-holes through which said pin extends when said telescoping runner is locked in said first position or said second position.

11. An accessory apparatus for use with a truck having opposing side panels, a truck bed extending between the side panels and a truck cab, said truck cab having a roof, said accessory comprising:

first and second outer runners;

means for attaching said first and second outer runners to each side panel of the truck in a position immediately above said side panel, behind the truck cab, and below the roof thereof;

a plurality of center bars extending transversely between said first and second outer runners across a width of the truck bed;

wherein the center bars define a support surface behind the truck cab immediately above the side panels of the truck for supporting a load;

a pair of telescoping runners each of said telescoping runners being received within one of said outer runners; means for adjustably locking said telescoping runners in a first extended position, thereby defining a first extension length, or in a second extended position, thereby defining a second extension length, said second extension length being greater than said first extension length.

12. The apparatus of claim 11, wherein said means for attaching comprises pedestals.

13. The apparatus of claim 11 wherein one of said outer runners includes a plurality of closed cradles for receiving first ends of said center bars.

14. The apparatus of claim 13 wherein another of said outer runners includes a plurality of open cradles for receiving the second ends of said center bars.

15. The apparatus of claim 11 wherein a first of said telescoping runners includes a closed cradle for receiving a first end of one of said center bars and a second of said telescoping runners includes an open cradle for receiving a second end of one of said center bars.

16. The apparatus of claim 11 wherein said outer runners include locating pin holes for stopping movement of said telescoping runners at said first extension length and said second extension length when a pin engages said locating pin holes.

* * * * *